United States Patent Office
3,441,481
Patented Apr. 29, 1969

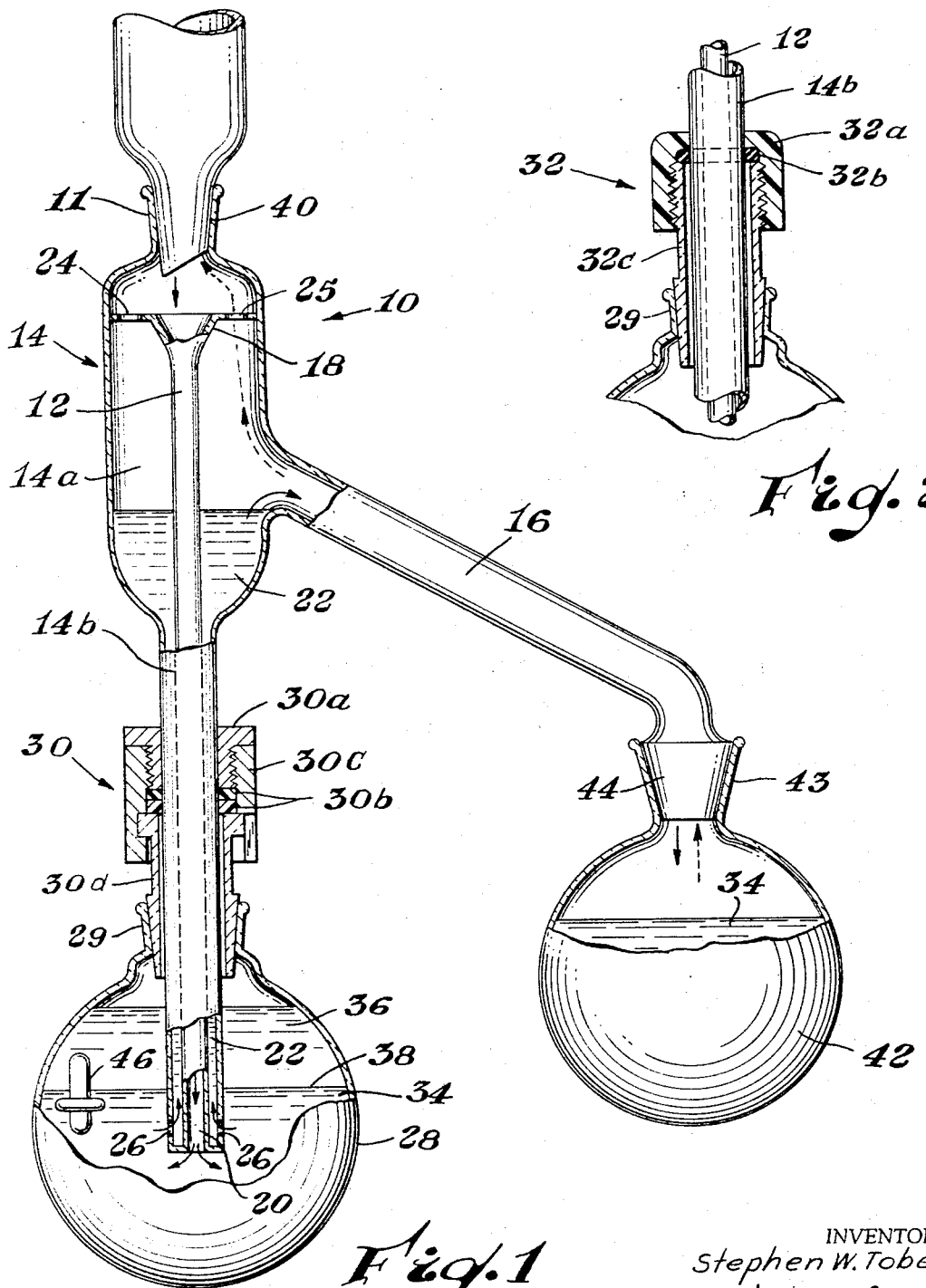

1

3,441,481
EXTRACTION APPARATUS
Stephen W. Tobey, Sudbury, Mass., assignor to The Dow Chemical Company, Midland, Mich., a corporation of Delaware
Continuation-in-part of application Ser. No. 658,800, Aug. 7, 1967. This application June 6, 1968, Ser. No. 735,055
Int. Cl. B01d 3/00
U.S. Cl. 202—169                 7 Claims

ABSTRACT OF THE DISCLOSURE

The invention concerns a unique extraction apparatus which combines a distributor tube with an extractor head to provide a one-piece unit or asembly useful for a variety of extraction operations. The distributor tube, in the form of a long stem funnel, is positioned coaxially within the body of the extractor head and is sealingly joined thereto to define a hollow circumferential chamber between the extractor head and the distributor tube. Port holes in the extreme lower end of the chamber provide for passage of a liquid solvent containing dissolved solute upwardly through the chamber to the juncture of a downwardly directed return arm joined to the upper part of the extractor head body. Once the level of the extractant solvent reaches this juncture, the solution spills over into the return arm and is directed into a reboiler flask or other suitable container means from which the dissolved solute can be recovered.

This application is a continuation-in-part of my copending application, U.S. Ser. No. 658,800, filed Aug. 7, 1967, assigned to the instant assignee and now Patent No. 3,397,115.

This invention relates generally to extraction apparatus More specifically, the present apparatus combines a distributor tube with an extractor head to provide a sturdy, one-piece extraction unit or assembly which can be used for essentially all of the conventitonal extraction techniques commonly being practiced. Such techniques generally include extraction of a solute from a liquid phase which is substantially immiscible with and more dense than the extractant solvent; extraction of a solute from a liquid phase which is substantially immiscible with and less dense than the extractant solvent; and extraction of a solute from a solid material or liquid dispersion or suspension of the solid.

To conduct the various extraction operations mentioned above generally requires a substantial amount of extraction apparatuses of various designs and capacities. Aside from the amount of equipment required, most of the extraction apparatuses presently available have other common disadvantages. One such disadvantage is that the extractor head is designed such that the capacity of the head itself and the capacity of the flask with which the head can be used are relatively limited, that is, the unit will accommodate only a given amount of an extractant solvent together with the liquid or solid to be extracted. Another disadvantage is found in the complex and fragile design of the extractor head itself, which generally includes a vapor tube and a return tube which form an integral part of and are positioned exterior to the extractor head. Such parts are easily broken when the extractor head is stored in a drawer or on a shelf or when it is being set up for operation.

The extraction apparatus disclosed in my copending application U.S. Ser. No. 658,800, as mentioned above, represents an earlier attempt to overcome some of the disadvantages of the prior devices. Briefly stated, my earlier device provides a novel distributor tube, generally resembling a long stem funnel, with the stem portion having an outer tube portion which encloses and is spaced apart from a coaxial inner tube portion to define a chamber between the respective tube portions. The inner tube portion, which has an integral funnel shaped top, defines a conduit through which an extractant solvent may be discharged into a solution or dispersion to be extracted when the tube is immersed in the solution or dispersion as contained in an extraction flask. Circular ports extending through the wall of the outer tube portion and into the chamber, one set of ports being positioned near the bottom of the outer tube portion and another set of ports positioned just below the funnel top, provide means for the extractant solvent containing dissolved solute to enter the chamber from the extraction flask and to exit from the chamber into an extractor head in which the distributor tube is placed. As illustrated in FIG. 1 of the patent drawing, a collar of rubber or similar material snugly fitted around the periphery of the distributor tube provides a preferred means for seating the tube in the extractor head so that it may be adjusted to any desired height to accommodate extraction flasks of various sizes. Additionally, the collar serves as a liquid-tight seal between the distributor tube and the throat portion of the extractor head to prevent the upper liquid phase in the extraction flask from rising in the extractor head. An alternative means for seating of the distributor tube and sealing the throat portion of the extractor flask, as illustrated in FIG. 5 of the patent drawing, is provided by an internally threaded screw cap which fits over the distributor tube to enclose an O-ring gasket and engage an externally threaded neck portion of the extractor head.

Although the extraction apparatus disclosed in Ser. No. 658,800 represents a significant improvement over the prior art apparatus, it has certain disadvantages which it would be desirable to eliminate. Such disadvantages include the following:

(1) The distributor tube must always be placed in a conventional extractor head. This requires two separate pieces of equipment which must be carefully stored when not in use and which require some care in setting up for operation to prevent breakage.

(2) Occasionally, due to a manufacturing flaw, the throat portion of the extractor head will not be in true vertical alignment with the extractor body, so that the distributor tube will be canted at an undesirable angle when seated in the extractor head. In some instances it is possible for the distributor tube to be canted at such an angle that the funnel top of the tube will not be properly aligned with the drip tip of the reflux condenser, so that the extractant solvent flowing downwardly from the reflux condenser will miss the funnel portion of the distributor tube and fall into the body portion of the extractor head.

(3) When the preferred collar sealing means is employed (as shown in FIG. 1 of the patent drawing), the size of the collar is limited to that which will fit into the space between the periphery of the distributor tube and the inner wall of the neck portion of the extractor head. When the cap and O-ring sealing means is used (as shown in FIG. 5 of the patent drawing), the outside diameter of the cap is limited to a size which will fit within the inside diameter of the extraction flask throat, thus placing severe restrictions on the construction of the cap. Since both of these sealing means are positioned inside the extraction flask, they have the additional disadvantage of being subjected to possible deterioration from reaction with the various solvents and other fluids in the extraction flask.

A primary object of the present invention, therefore, is to provide an extraction apparatus which overcomes the disadvantages of the prior art apparatus.

A more specific object of the invention is to provide an extraction apparatus in which a variety of substances may be extracted from a liquid solution or dispersion phase, wherein the extractant solvent is substantially immiscible with and of a different density than the phase to be extracted.

Another object of the invention is to provide an extraction apparatus which combines a distributor tube with an extractor head in a sturdy, one-piece unit or assembly.

A further object of the invention is to provide an extraction apparatus which may be used with a variety of conventional extraction equipment, particularly extraction flasks of various sizes and capacities, to extract liquids or solids from solutions or dispersions in which the volume of such solutions or dispersions may vary considerably.

Still another object of the invention is to provide a combined distributor tube-extractor head unit in which an adapter means for sealing the throat of the extraction flask and which provides a guide for vertical adjustment of the extraction unit in the flask, is fitted onto said unit above the throat of and external to the extraction flask.

Other objects and advantages of the invention will be apparent from reference to the following description taken in conjunction with the accompanying drawing in which:

FIGURE 1 is a side elevation view, partly in section, of a preferred embodiment of an extraction apparatus according to this invention.

FIGURE 2 is a fragmentary side elevation view, in section, of the extraction apparatus shown in FIGURE 1, illustrating an alternate adapter means which may be employed with such apparatus.

The drawing illustrates only one of numerous embodiments within the scope of this invention and the form shown is selected for convenient illustration and clear demonstration of the principles involved. Where appropriate, corresponding parts of the embodiment illustrated herein are designated with the same numerals.

GENERAL DESCRIPTION

Referring to the drawing, and particularly to FIGURE 1, numeral 10 refers in general to the extraction apparatus unit of this invention. As shown in the drawing, extraction apparatus 10 is a one-piece unit comprising basically a distributor tube 12, which is positioned vertically within and in coaxial relationship to an extractor head 14 having an upper or body portion 14a and a lower or stem portion 14b. Extractor head 14 also includes a downwardly directed return arm 16 which is joined integrally to the extractor head 14 on one side of body portion 14a. Distributor tube 12 generally resembles a long stem funnel in which the stem portion extends downwardly from an integral radially outwardly flared funnel shaped top 18. The hollow stem portion of distributor tube 10 defines a conduit 20 which provides a passageway for an extractant solvent. Extractor head 14 completely encloses and is spaced apart from distributor tube 12, thereby defining a hollow annular chamber 22 between the outer wall of the distributor tube and the inner wall of the extractor head. The extreme lower end of chamber 22 is enclosed by sealing engagement of distributor tube 10 with extractor head 14. A plurality of bridging members (generally two or more), as indicated at 24 and 25, integrally join funnel top 18 with the inner wall of body portion 14a of extractor head 14. Bridging members 24 and 25 assure coaxial alignment of distributor tube 12 with extractor head 14 and also serve as additional support for the distributor tube. Several spaced-apart generally circular holes, designated as port means 26, are located in the extreme lower end of stem portion 14b of the extractor head 14. Port means 26 are equally spaced around the periphery of stem portion 14b and extend only through the wall thereof to provide openings for an extractant solvent to enter chamber 22. In the preferred form of apparatus 10, port means 26 comprise a series of four circular holes, it being readily understood that the invention is not limited to this precise embodiment. The shape, size and spacing of the port holes may be varied to suit the particular conditions of a given extraction procedure.

In setting up extractor head 14 in a typical extraction flask 28, an adapter assembly, as generally designated by numeral 30, provides means for sealing the throat portion 29 of flask 28 and at the same time it serves as a guide or seat for vertical positioning or adjustment of stem portion 14b to the particular height desired in flask 28. A preferred adapter assembly for this purpose, which is generally referred to in the trade as a "universal joint adapter," is commercially available in various sizes from Rho Scientific, Inc., Commack, N.Y. The complete adapter assembly, which is fitted over stem portion 14b of extractor head 14 consists basically of an externally threaded screw plug 30a (aluminum), two or more plastic resin sealing gaskets 30b (Teflon fluorocarbon) an internally threaded screw coupling or junction 30c (aluminum), and a special glass adapter 30d, having a standard taper ground glass seal for seating in throat portion 29 of extraction flask 28.

In FIGURE 2 there is illustrated an alternative adapter assembly, as generally designated by numeral 32, which may be used in the practice of this invention. Adapter assembly 32, which as indicated in the drawing, also fits over stem portion 14b og extractor head 14, comprises basically an internally threaded screw cap 32a, a conventional compressible O-ring gasket 32b and a glass adapter 32c. The upper portion of glass adapter 32c is externally threaded for engagement with the internal thread of screw cap 32a and the lower portion of the adapter is fabricated with a standard taper ground glass seal for seating in throat portion 29 of extraction flask 28. Desirably, screw cap 32a is constructed of a suitably durable plastic material resistant to organic solvents and having good tensile and compressive strength. Such materials include polymers and copolymers of chlorotrifluoroethylene (Kel-F), tetrafluoroethylene fluorocarbon resins (Teflon), synthetic polyamides (nylon), and the like. Suitable compressible materials for O-ring gasket 32b would include various rubber compounds, such as fluoroelastomers (Viton) and chloroelastomers (neoprene), and various plastic materials, such as Teflon resins and the like, as mentioned above.

OPERATION

Operation of the extraction apparatus 10 may be readily understood by reference to FIGURE 1. A typical extraction procedure which may be carried out with the present apparatus is extraction of a solute dissolved in a liquid phase, wherein the extractant solvent employed is more dense than the liquid phase to be extracted, such as extraction of phenol dissolved in a water solution with chloroform as the extractant solvent. An example of how such a procedure could be conducted in the practice of this invention, with the apparatus as shown in FIGURE 1, is to dissolve about 2.5 grams of phenol in 250 ml. of water and charge the aqueous solution to an extraction flask 28 (500 ml. round bottom flask). To this solution is added about 150 ml. of chloroform as the extractant solvent. Since chloroform is much more dense than water and substantially immiscible therewith, a distinct separation between the chloroform phase 34, and the aqueous phenol solution 36 will occur. As illustrated in FIGURE 1, chloroform phase 34 will settle in the lower portion of flask 28, whereas the aqueous phenol solution 36 will float on the surface of the chloroform phase. An interface 38 defines the separation of the respective liquid phases in flask 28. With adapter assembly 30 in loose-fitting position on extractor head 14, the extractor head is raised to a point where port holes 26 in stem portion 14b are well immersed into chloroform phase 34. Screw plug 30a is then engaged with screw coupling 30c to compress gaskets 30b against the upper lip of adapter 30d, so that the entire adapter assembly fits snugly around stem portion 14b of the extractor head and thereby holds the extractor head at the desired operating position. A reflux condenser (not shown) is fitted to body portion 14a of extractor head 14 so that the drip tip 40 of the condenser sealingly engages throat portion 11 of the extractor head and extends a short distance into body portion 14a. An additional 150 ml. of the chloroform extractant solvent 34 is charged to a reboiler flask 42 (500 ml. round bottom flask) and the flask is sealingly connected to return arm 16 of extractor head 14 by insertion of male joint 44 into throat portion 43 of the reboiler flask. Reboiler flask 42 is mounted on a conventional heating mantle (not shown) or other suitable heating means to provide heat for vaporizing the chloroform extractant solvent.

The extraction process is initiated by heating the chloroform solvent 34 sufficiently to vaporize the solvent, at which point the heat input is maintained at a constant level to provide continuous vaporization. The constantly vaporizing fumes will flow upwardly through return arm 16 and thence through the spaces between bridging members 24 and 25 and up into the reflux condenser through drip tip 40, following a path as indicated by the broken arrows in FIGURE 2. Upon condensing to a liquid in the reflux condenser, the chloroform solvent will flow downwardly through drip tip 40 and drip in a continuous stream or steady dropwise flow into funnel top 18 of distributor tube 12. From funnel top 18 the solvent descends through conduit 20 of the distributor tube and flows into chloroform phase 34 in extraction flask 28. If desired, extraction of the dissolved phenol from the aqueous phenol phase 36 can be aided by a magnet stirring bar 46, which is rotated slowly at interface 38 by a motor driven rotating magnet (not shown), which is placed externally to extraction flask 28. Agitation of interface 38 in this manner increases the contact area between the respective phases and thus hastens extraction of the phenol. Although the agitation procedure is desirable in hastening extraction of the dissolved solute, those skilled in the art will appreciate that this procedure is not necessary to the normal function of the extraction apparatus of this invention. As indicated by the solid arrows in FIGURE 2, the chloroform solvent 34, which contains dissolved phenol, will enter chamber 22 of extractor head 14 through ports 26 and rise upwardly through the chamber until the level of the solvent reaches the juncture of return arm 16 with the extractor head. Once the solvent 34 rises above this juncture, it will spill over into return arm 16 and flow downwardly into reboiler flask 42. The dissolved phenol in the chloroform solvent which returns to the reboiler flask will remain in solution in the flask, but the returning solvent will constantly revaporize and thus circulate back through the system to maintain a continuous extraction cycle. After a sufficient time has elapsed (usually a period of several hours) for the chloroform solvent to carry substantially all of the phenol into the chloroform phase 34 in reboiler flask 42, the flask is disconnected from extractor head 14 and the solvent in flask 42 is flashed off under aspirator vacuum to recover the phenol as a solid crystalline product.

Although the preferred embodiment, as described above, is directed to extraction of a solute from a liquid phase with a liquid solvent which is *more* dense and substantially immiscible with the phase to be extracted, it will be understood by those skilled in the art that the extraction apparatus 10 would function equally well in the extraction of a solute from a liquid phase with a liquid solvent which is *less* dense and substantially immiscible with the phase to be extracted. An extraction procedure of the latter type, for example, would be extraction of phenol from a water solution using diethyl ether as the extractant solvent. In such an extraction procedure, of course, the ether phase would float on the surface of the aqueous phenol phase in the extraction flask, thus making it necessary to raise extractor head 14 to a point where port holes 26 in stem portion 14b would be immersed only in the ether (upper) phase.

In another embodiment of this invention, it is also contemplated that extraction apparatus 10 could be used in the extraction of a solute from a solid material suspended or dispersed in a liquid phase. Such an extraction procedure might be represented, for example, by extraction of a carotenoid substance, such as lycopene, from tomato rinds. In an extraction procedure of this type a thimble fabricated of a porous cellulosic filter material, such as filter cloth or paper, can be fastened over the lower end of stem portion 14b of extractor head 14, so that the thimble extends above and completely encloses the port holes 26. In this embodiment the porous thimble acts as a screen which will allow the extractant solvent containing the lycopene solute to pass through the thimble into port holes 26 and thus into chamber 22, but at the same time will prevent the solid tomato rind particles in the dispersion medium from entering the port holes. For the sake of simplicity in describing the present invention the foregoing embodiment is not illustrated in the drawing, but if a better understanding of such a modification is desired, a similar embodiment is illustrated in FIGURE 3 of the drawing in my copending application Ser. No. 658,800.

Although the various construction dimensions of extraction apparatus 10 are not considered to be critical, it is particularly desirable that the length of stem portion 14b of extractor head 14 be such that the extractor head can be vertically adjusted, that is, raised or lowered within an extraction flask having a volume of anywhere from about 100 to 5000 ml. and which may contain anywhere from about 25 to 4000 ml. of a solution or dispersion. Additionally, it would be obvious that funnel top 18 of distributor tube 12 should be a sufficient distance above the juncture of return arm 16 with extractor head 14 so that the extractant solvent rising in chamber 22 will not spill over into the distributor tube.

While the inventive concept is specifically described in the foregoing specification and the accompanying drawing, it is understood that numerous modifications and variations with respect to form, size, arrangement of parts, and operation of mechanical details may be made without departing from the spirit or scope of the invention.

What is claimed is:

1. In an extraction apparatus generally employed in conjunction with an extraction flask, a reflux condenser and a reboiler flask to extract a solute from a liquid phase with an extractant solvent which is substantially immiscible with and of a different density than the liquid phase to be extracted, the improvement which comprises:
   (a) a one-piece extractor head unit which includes a distributor tube having a funnel-shaped top with a stem portion extending therefrom, in combination with an extractor head having a body portion with a stem portion extending therefrom and including a downwardly directed return arm joined to said body portion,
   (b) the extractor head being spaced from and coaxially enclosing the distributor tube thereby defining an annular chamber therebetween, the lower stem portions of the extractor head and the distributor tube being sealingly joined to integrate the head with the tube,
   (c) the stem portion of the distributor tube defining a conduit for passage of a solvent from a reflux condenser fitted to the extractor head unit into an extraction flask in which the extractor head unit is seated,
   (d) port means located in the stem portion of the extractor head providing means for the extractant solvent to enter the annular chamber and ascend therein to the return arm, through which the solvent is conducted to a reboiler flask connected to the return arm, and
   (e) an adapter means fitted over the stem portion of the extractor head externally of the extraction flask, said adapter means providing sealing engagement of the extractor head unit with the extraction flask and permitting vertical adjustment of the extractor head unit within the extraction flask.

2. The apparatus of claim 1 wherein at least two bridging members connect the funnel-shaped top of the distributor tube with the body portion of the extractor head.

3. The apparaus of claim 1 wherein said port means comprise generally circular spaced-apart holes which are located in the extreme lower end of the stem portion of the extractor head and extend only through the wall of said stem portion.

4. The apparatus of claim 1 wherein said adapter means comprises an externally threaded screw plug which engages an internally threaded coupling to compress a set of gaskets enclosed by the plug against the upper lip of an adapter, the upper portion of the adapter being retained by the coupling and the lower portion thereof being seated in the throat of the extraction flask.

5. The apparatus of claim 1 wherein said adapter means comprises an internally threaded screw cap which engages the externally threaded upper portion of an adapter to compress an O-ring gasket enclosed by the screw cap against the upper lip portion of the adapter, the lower portion of the adapter being seated in the throat of the extraction flask.

6. In an extraction apparatus generally employed in conjunction with an extraction flask, a reflux condenser and a reboiler flask to extract a solute from a solid material in which the extraction is made with a liquid extractant solvent from a dispersion of the solid in a liquid phase, the improvement which comprises:
  (a) a one-piece extractor head unit which includes a distributor tube having a funnel-shaped top with a stem portion extending therefrom, in combination with an extractor head having a body portion with a stem portion extending therefrom and including a downwardly directed return arm joined to said body portion,
  (b) the extractor head being spaced from and coaxially enclosing the distributor tube thereby defining an annular chamber therebetween, the lower stem portions of the extractor head and the distributor tube being sealingly joined to integrate the head with the tube,
  (c) the stem portion of the distributor tube defining a conduit for passage of a solvent from a reflux condenser fitted to the extractor head unit into an extraction flask in which the extractor head unit is seated,
  (d) port means located in the stem portion of the extractor head providing means for the extractant solvent to enter the annular chamber, a thimble of porous material enclosing the lower end of the stem portion of the extractor head and extending above said port means, said thimble preventing solids in the liquid dispersion from entering said chamber, the solvent ascending the chamber to the return arm through which it is conducted to a reboiler flask connected to the return arm, and
  (e) an adapter means fitted over the stem portion of the extractor head externally of the extraction flask, said adapter means providing sealing engagement of the extractor head unit with the extraction flask and permitting vertical adjustment of the extractor head unit within the extraction flask.

7. The apparatus of claim 6 in which the thimble comprises a porous cellulosic filter material.

References Cited

UNITED STATES PATENTS

| | | | |
|---|---|---|---|
| 2,610,148 | 9/1952 | Lundy | 23—267 |
| 2,660,518 | 11/1953 | White | 23—272.6 |
| 3,397,115 | 8/1968 | Tobey | 202—169 |

SAMIH N. ZAHARNA, *Primary Examiner.*

U.S. Cl. X.R.

23—259, 267